United States Patent
Bensch et al.

(10) Patent No.: US 7,832,813 B2
(45) Date of Patent: Nov. 16, 2010

(54) PARKING BRAKE MODULE FOR A PRESSURE MEDIUM-OPERATED BRAKE SYSTEM

(75) Inventors: Uwe Bensch, Hannover (DE); Heinrich Diekmeyer, Barsinghausen (DE); Jörg Helmer, Vogt (DE); Bernd-Joachim Kiel, Wunstorf (DE); Andreas Schäl, Nordstemmen (DE); Frank Van Son, Tilburg (NL)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 12/449,467

(22) PCT Filed: Feb. 1, 2008

(86) PCT No.: PCT/EP2008/000796

§ 371 (c)(1),
(2), (4) Date: Mar. 23, 2010

(87) PCT Pub. No.: WO2008/101592

PCT Pub. Date: Aug. 28, 2008

(65) Prior Publication Data

US 2010/0187902 A1    Jul. 29, 2010

(30) Foreign Application Priority Data

Feb. 21, 2007    (DE)    ..................... 10 2007 008 504

(51) Int. Cl.
*B60T 13/68* (2006.01)
(52) U.S. Cl. .................. 303/15; 303/20; 188/3 H
(58) Field of Classification Search .......... 188/3 H, 188/3 R, 112 R; 303/3, 15, 20, 22.4, 9.63, 303/127
See application file for complete search history.

(56) References Cited

U.S. PATENT DOCUMENTS

| 5,848,826 | A | * | 12/1998 | Muller | ............... | 303/22.4 |
| 6,626,505 | B2 | * | 9/2003 | Frank et al. | ............... | 303/15 |
| 2005/0029859 | A1 | * | 2/2005 | Bensch et al. | ............... | 303/89 |
| 2009/0309413 | A1 | * | 12/2009 | Bensch et al. | ............... | 303/20 |
| 2010/0025141 | A1 | * | 2/2010 | Bensch et al. | ............... | 180/271 |

(Continued)

FOREIGN PATENT DOCUMENTS

DE    34 44 639 A1    6/1986

(Continued)

*Primary Examiner*—Christopher P Schwartz
(74) *Attorney, Agent, or Firm*—Kramer Levin Naftalis & Frankel LLP (57) ABSTRACT

A parking brake module for a pressure medium-operated brake system of a vehicle having a parking brake function enabled by at least one spring brake cylinder includes a first valve device that increases the amount of pressure medium and has an inlet that can be connected to a pressure medium reservoir, an outlet that can be connected to at least one spring-loaded part of a spring brake cylinder, and a control input connected to a control line. A second valve device encompasses at least one first connection used as a trailer control valve connection and can be connected to a trailer control valve to control a trailer brake. To provide a valve concept for different vehicle configurations, particularly including an anti jackknifing function, pressure prevailing at the first connection can be adjusted regardless of pressure prevailing in the pressure medium reservoir and at the outlet of the first valve device.

21 Claims, 10 Drawing Sheets

U.S. PATENT DOCUMENTS

2010/0072810 A1 * 3/2010 Bensch et al. .................. 303/17

FOREIGN PATENT DOCUMENTS

| | | |
|---|---|---|
| DE | 198 57 393 A1 | 1/2000 |
| DE | 103 36 611 A1 | 3/2005 |
| DE | 10 2005 019 479 B3 | 1/2007 |
| EP | 0 268 045 A2 | 5/1988 |
| WO | WO 03/097423 * | 11/2003 |

* cited by examiner

PARKING BRAKE MODULE FOR A PRESSURE MEDIUM-OPERATED BRAKE SYSTEM

FIELD OF THE INVENTION

The present invention generally relates to a parking brake module for a pressure medium operated brake system of a vehicle having a parking brake function.

BACKGROUND OF THE INVENTION

A parking brake module of the general type under consideration is described in DE 103 36 611 A1, in particular FIG. 8. This module has a plurality of valves or valve devices that can mainly be activated electrically. On the one hand, the parking brake module is connected to a compressed air reservoir vessel. On the other hand, a first compressed air line leads to a spring-loaded component of a spring-type brake cylinder embodied as a combined spring-type/diaphragm brake cylinder. Such combined brake cylinders have both the function of diaphragm brake cylinders and a spring-loading function. The brake cylinders each include a diaphragm component that is pneumatically connected to the service brake system and to which the actual brake pressure can be applied. In addition, such brake cylinders each include a spring-loaded component that is pneumatically disconnected from the diaphragm component and to which compressed air can be applied via separate compressed air lines.

The spring-loaded component implements the spring-loading function by virtue of the fact that when compressed air is applied to the spring-loaded component a pre-loaded spring is pre-stressed and, in the process, a braking effect of the spring energy stores is reduced. When the spring-loaded component is vented, the pre-loaded spring is relaxed so that, in the scope of the spring-loading function, a braking effect is applied to the brake that is connected to the respective brake cylinder. Brake cylinders of this type are referred to hereinafter as spring-type brake cylinders. Such spring-type brake cylinders enable a parking brake function that permits the vehicle to be braked or arrested even when there is a lack of compressed air.

The above-mentioned parking brake module has a further connection to a trailer control valve. The trailer control valve is used to control the brake pressure of an attached trailer vehicle; and, in this context, this should also be understood to apply to a semitrailer. The trailer control valve has a port for a control line of the trailer service brake that leads to the trailer vehicle. The trailer control valve inverts the pressure applied to its inlet. That is, if a high pressure coming from the service brake module is present at its input, a low service brake pressure is modulated, and vice-versa.

The parking brake module has a first valve device, specifically a relay valve, and a second valve device, a pressure-holding valve and a bistable valve. The relay valve includes an inlet that can be connected to a compressed air reservoir vessel. The relay valve further includes an outlet that can be connected to at least one spring-loaded component of a spring-type brake cylinder. The relay valve also includes a control inlet. The pressure applied to the control inlet is modulated at the outlet of the relay valve, but with a significantly larger quantity of air. In this way, the necessary volumes for activating the spring-type brake cylinders can be made available.

The control pressure applied to the control inlet of the relay valve can be set using a pressure-holding valve and a bistable valve. In this way, the pressure at the outlet of the relay valve can also be set.

The second valve device includes a 3/2 way solenoid valve. A first port of this 3/2 way solenoid valve leads to the line that leads to the trailer control valve. A second port of this valve is connected to the outlet of the relay valve. A third port can be connected to the compressed air reservoir vessel. In a de-energized state, this 3/2 way solenoid valve connects the first port to the second port, while the first port is shut off from the third port. In contrast, in an energized state, the first port is shut off from the second port and the first port is connected to the third port.

In an energized state of this 3/2 way solenoid valve, the trailer control valve is therefore vented, and, in this way, the trailer brake is released. Venting the trailer control valve at this port leads, specifically, to a reduction in the service brake pressure at the outlet of the trailer control valve, with the result that the trailer brake pressure decreases and the trailer brake is, thus, released.

However, in a de-energized state, the pressure in the trailer control valve is the same as the pressure at the outlet of the relay valve, and, therefore, identical to the pressure in the spring-loaded component of a spring-type brake cylinder.

However, the conventional pneumatic circuit arrangement described above leads to a situation in which it is not possible to brake the trailer while the towing vehicle is unbraked. With the conventional parking brake module, it is, therefore, not possible to implement what is referred to as a trailer safety brake function.

Such parking brake systems are used in different vehicle control systems such as, for example, electronic brake systems, anti-lock brake systems or systems without anti-lock brake protection. The parking brake module has to be adapted to these different vehicle control systems. It is, therefore, manufactured in a wide variety of designs. This reduces the respective number of a specific type of parking brake module. However, a reduced number increases the costs of manufacture, administration and stock keeping.

SUMMARY OF THE INVENTION

Generally speaking, it is an object of the present invention to provide a single valve design for a parking brake module suitable for various vehicle configurations, and, in particular, a valve design that also permits a trailer safety brake function.

In accordance with embodiments of the present invention, a pressure prevailing at the first port of the second valve device, i.e., the pressure conducted to the trailer control valve, can be set independently of the pressure in the pressure medium reservoir vessel as well as of the pressure at the outlet of the pressure medium-quantity-boosting valve device, i.e., independently of the pressure in the spring-loaded component of the spring-type brake cylinder. The spring energy store and the trailer control valve can therefore be decoupled.

The possibility of setting the pressure for the trailer control valve independently of the pressure for the spring-type brake cylinders allows the trailer to be braked while the towing vehicle is unbraked. This also permits a trailer safety brake function to be implemented.

Furthermore, the inventive construction also permits a trailer monitoring setting, in particular in ABS vehicles. In addition, the implementation of a basic parking brake function and a hill-holder function, i.e., a function in which a vehicle is held with the brake on even without activating the brake pedal, is permitted. With such a function, it is necessary to provide particular safety precautions so that the vehicle does not unintentionally roll away.

The parking brake module according to exemplary embodiments of the present invention can be used in virtually all vehicles with any vehicle control systems, such as, for example, vehicles with an electronic brake system or anti-lock brake system or without anti-lock brake protection, in which context a variety of functions of a parking brake can be carried out without the parking brake module being over-equipped for minimum requirements.

Overall, a universal valve design for a parking brake module is provided that can implement a variety of functions in vehicles with electronic brake systems or anti-lock brake systems or without vehicle control systems.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

Further advantageous embodiments can be found in the claims and from the exemplary embodiments that are discussed in greater detail with reference to the accompanying drawings, in which

DETAILED DESCRIPTION OF THE PREFERRED EMBODIMENTS

In the drawing figures, identical reference symbols are used for corresponding components. The figures also show exemplary embodiments that are used in a compressed-air-operated brake system, i.e., a pneumatic brake system. In this respect, compressed air is used as the pressure medium. As an alternative, however, the exemplary embodiments of the present invention can also be used with hydraulic systems, in which case, for example, an hydraulic oil is used as the pressure medium.

Figure 1:
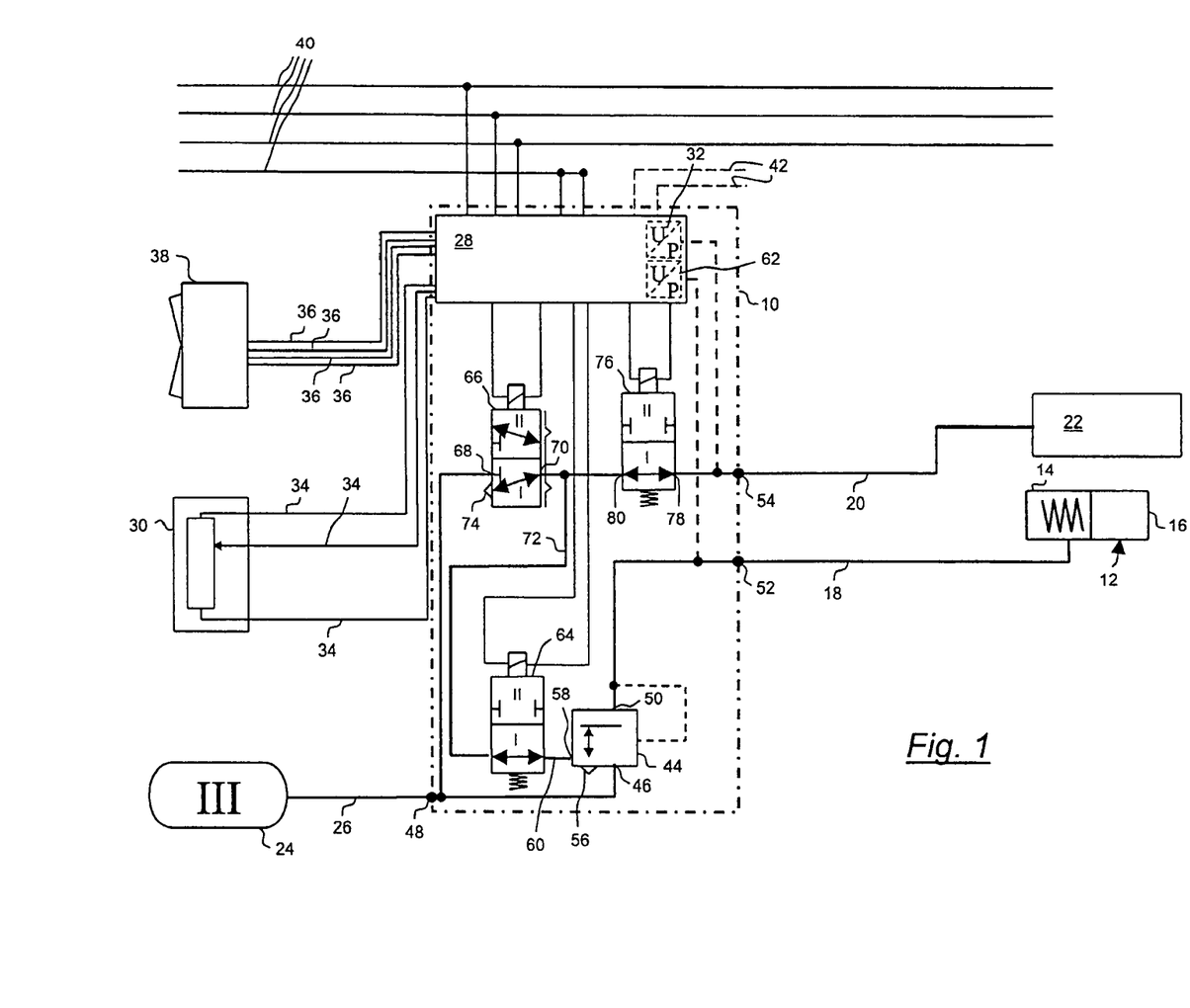
FIG. 1 is a schematic diagram of a parking brake module and further components of a brake system of a vehicle in a first exemplary embodiment according to the present invention

Referring now to the drawing figures, FIG. 1 shows a parking brake module 10 of a pneumatic brake system for a vehicle, in particular, a utility vehicle or truck, that can be operated with a trailer vehicle including a brake system that is also pneumatic. The illustrated parking brake module 10 is located in the towing vehicle. The towing vehicle has both a service brake and a parking brake, which brakes are embodied by means of spring-type brake cylinders 12 of the type discussed hereinabove. That is, the spring-type brake cylinder 12 has a spring-loaded component 14 and a diaphragm component 16 for the service brake. In order to release the spring-loaded brake or parking brake, the spring-loaded component 14 is ventilated. This ventilation is carried out via a compressed air line 18 connected to the parking brake module 10.

Just one spring-type brake cylinder 12 is illustrated in each of the drawing figures. Such spring-type brake cylinders are, however, preferably used on at least the wheels of one axle or a plurality of axles of the towing vehicle (and, if appropriate, also of the trailer vehicle). The compressed air line 18 therefore preferably leads not only to one spring-type brake cylinder, but rather to a plurality, i.e., at least two, of such spring-type brake cylinders, but only one thereof is illustrated here. However, in another exemplary embodiment, just one spring-type brake cylinder that acts on, for example, a Cardan shaft, is provided.

The parking brake module 10 also has a connection, via a further compressed air line 20, to a trailer control valve 22 provided for controlling the trailer brakes. The trailer control valve 22 is arranged in the towing vehicle. The trailer control valve 22 operates in the way discussed hereinabove. Reference is made to the above discussion, in particular with respect to spring-loaded brakes and trailer control valves.

The trailer control valve 10 is also connected to a compressed air reservoir vessel 24 via a further compressed air line 26. This compressed air reservoir vessel 24 provides the parking brake module 10 with compressed air that the parking brake module 10 can feed to the spring-type brake cylinder 12 via the compressed air line 18, or to the trailer control valve 22 via the compressed air line 20.

The way in which compressed air can be fed to, or carried away from, the spring-type brake cylinder 12 or the trailer control valve 22 is determined by means of an electronic control unit 28 arranged in the parking brake module 10 or in a separate unit. This electronic control unit 28 is designed to receive electrical signals from external and internal components. For example, the electronic control unit 28 receives an electrical activation signal for the trailer brake from an electrical activation unit 30 for the trailer brake. This electrical activation unit 30 is preferably arranged in the driver's cab of the towing vehicle and is designed, for example, as an operator control element that can be activated manually.

An actuation signal for the trailer brake can be generated by means of this electrical activation unit. The actuation signal can represent, in particular, either a desired brake pressure or else a vehicle deceleration. In order to provide a means of control that corresponds to this actuation signal, the pressure applied to the trailer control valve 22 is measured by means of a pressure sensor 32 arranged in or outside the parking brake module 10 that can determine the pressure in the compressed air line 20, and, therefore, the pressure that is fed to the trailer control valve 22.

If a deceleration request can be preselected by means of the activation unit 30, the electronic control unit 28 must be able to access a vehicle deceleration value that is derived, for example, from a vehicle velocity value obtained by means of wheel speed sensors, for example.

The electrical activation unit 30 is connected to the electronic control unit 28 via electrical lines 34 in order to exchange corresponding signals.

The electronic control unit 28 is also connected via electrical lines 36 to an operator control element 38 for activating a trailer monitoring function. This operator control element 38 is also accommodated in the driver's cab of the towing vehicle.

Although FIG. 1 shows a plurality of electrical lines 34 and 36 that are each connected to the electronic control unit 28, an individual signal line connected to the electronic control unit is sufficient. The bodywork of the vehicle can also be used as a ground line.

Instead of transmitting electrical signals from the activation unit 30 for the trailer brake or from the operator control element 38 for the trailer monitoring function, it is also possible to provide for signals to be correspondingly transmitted to the electronic control unit 28 by radio.

The electronic control unit 28 is also connected to further electrical lines 40 for supplying electrical power and for connecting to other systems.

The electronic control unit 28 is connected by means of a data bus to data lines 42 for exchanging data with further components.

The electronic control unit 28 serves to electrically activate valves or valve devices in the parking brake module 10. The parking brake module 10 has, in particular, a first air-quantity-boosting valve device in the form of a relay valve 44. The relay valve 44 includes an inlet 46 that is connected to a port 48 for the compressed air reservoir vessel 24. The relay valve 44 also has an outlet 50 that is connected to a port 52 of the parking brake module 10. The port 52 can be connected to the compressed air line 18 that leads to the spring-type brake cylinder 12. In addition, the parking brake module 10 has a further port 54 that can be connected to the trailer control valve 22 by the compressed air line 20.

The relay valve 44 also includes a schematically illustrated venting means 56 via which compressed air can escape. The venting means 56 and further venting means of further valves are preferably connected to a common venting device via which the compressed air can then escape centrally to atmosphere.

The relay valve 44 also has a control inlet 58 via which a control pressure can be fed to the relay valve 44 via a control line 60. The relay valve 44 modulates precisely this control pressure at its port 50, but the relay valve boosts the quantity of air, i.e., the volume made available at the outlet 50 of the relay valve 44 is significantly greater than the volume transported in the control line 60.

The pressure at the outlet 50 of the relay valve 44, and, therefore, the pressure that can be conducted to the spring-type brake cylinder 12, is measured by means of a pressure sensor 62. This pressure sensor 62 supplies, as does the pressure sensor 32, an electrical signal to the electronic control unit 28.

The control pressure at the control inlet 58 of the relay valve 44 is determined by means of a pressure-holding valve 64 and bistable valve 66. For this purpose, the pressure-holding valve 64 is connected upstream of the control inlet 58 of the relay valve 44, with the result that the control line 60 can be shut off or opened by means of this pressure-holding valve 64.

The pressure-holding valve 64 is embodied as an electrically activated 2/2 way solenoid valve.

The bistable valve 66 has an inlet 68 connected to the port 48 for the compressed air reservoir vessel 24. In addition, the bistable valve 66 has an outlet 70 that is connected to the pressure-holding valve via a pressure medium duct 72. Finally, the bistable valve 66 has a venting means 74 via which compressed air can escape.

The bistable valve 66 includes a bistable switching function with two switched states. That is, the bistable valve 66 retains its state even if it is no longer energized.

In contrast, the pressure-holding valve 64 is a spring-loaded valve, and in a de-energized state, this spring-loaded valve assumes the first switched state illustrated in FIG. 1, i.e., it connects through, and, in so doing, connects the control line 60 to the pressure medium duct 72. In an energized, second switched state it closes so that the pressure in the control line 60, and, therefore, the pressure at the control inlet 58, and also at the outlet 50 of the relay valve 44, is maintained.

The bistable valve 66 has a first switched state in which compressed air can be conducted away from the pressure-holding valve 64 via the venting means 74. This switched state is illustrated in FIG. 1. In a second switched state of the bistable valve 66, compressed air can be fed to the pressure-holding valve 64 from the compressed air reservoir vessel 24.

In a first switched state of the bistable valve 66, the outlet 70 is therefore connected to the venting means 74, while the outlet 70 is shut off from the inlet 68. In contrast, in the second switched state the outlet 70 is connected to the inlet 68, while the outlet 70 is shut off from the venting means 74.

The parking brake module 10 also has a second valve device 76. This second valve device 76 includes, for its part, at least a first port 78 connected to the port 54 for the trailer control valve 22. In addition, this second valve device 76 has a second port 80 that is connected to the pressure medium duct 72, and, therefore, any pressure that can be set in the pressure medium duct 72 between the atmospheric pressure and the pressure in the compressed air reservoir vessel 24 can be applied to second port 80.

The second valve device 76 has at least two switched states. In the first switched state (illustrated in FIG. 1), the first port 78 is connected to the second port; in the second switched state, the first port 78 is shut off from the second port 80. The compressed air line 20 that leads to the trailer control valve 22 can therefore be shut off by means of second valve device 76.

According to the embodiment of the present invention illustrated in FIG. 1, the second valve device 76 is an electrically activated solenoid valve, specifically, a 2/2 way solenoid valve. This electrically activated solenoid valve is spring-loaded; and, in a de-energized state, it assumes the first switched state, and, in an energized state, it assumes the second switched state.

Figure 2:
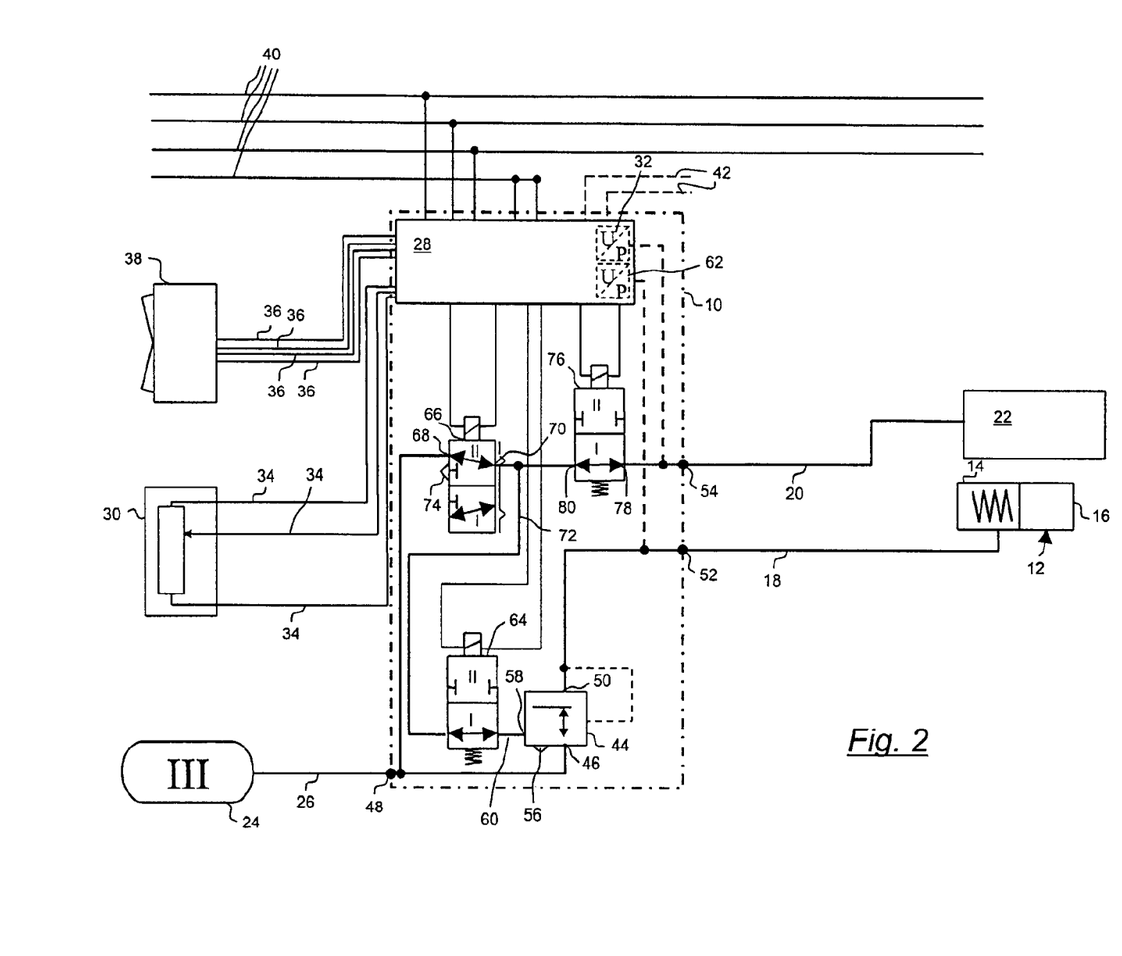
FIG. 2 is a schematic diagram of the parking brake module according to FIG. 1 in a state for clarifying a parking brake.
Figure 3:
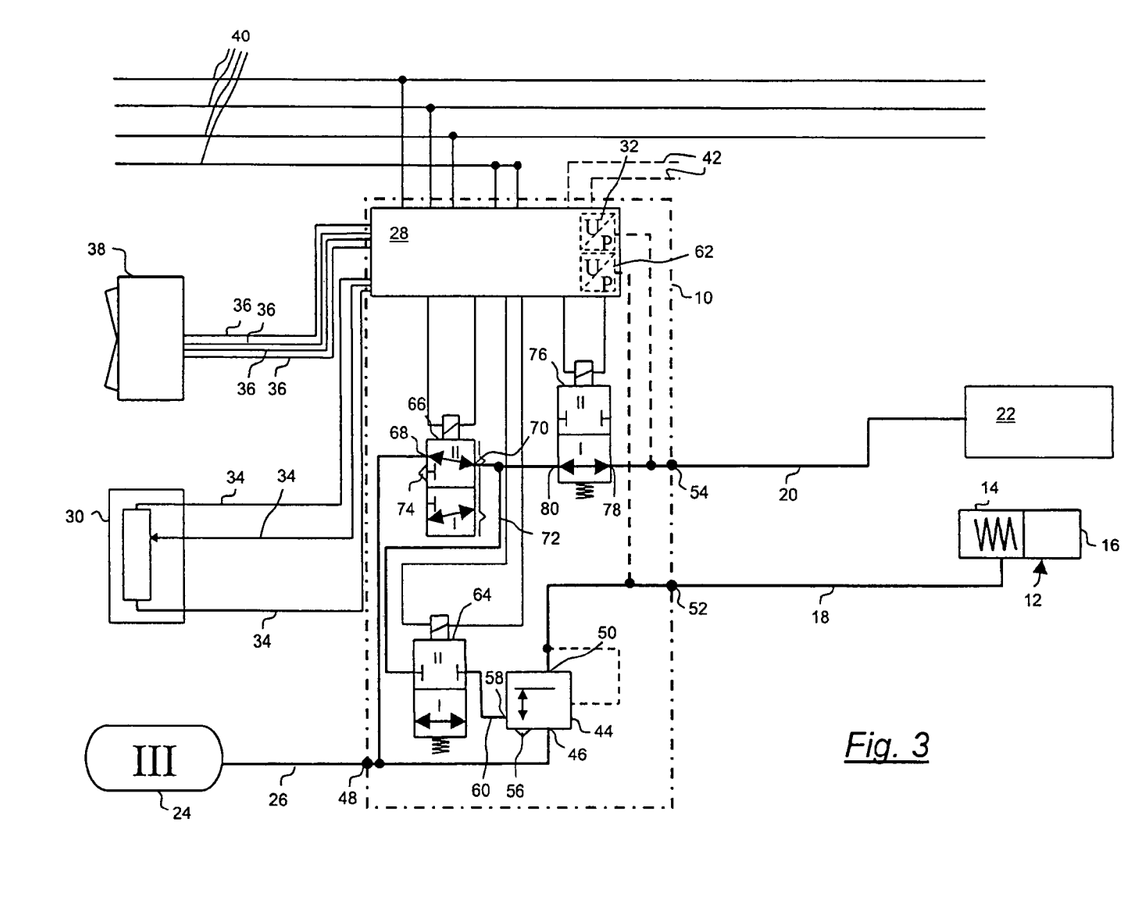
FIG. 3 is a schematic diagram of the parking brake module according to FIG. 1 in a state for clarifying a trailer monitoring setting.
Figure 4:
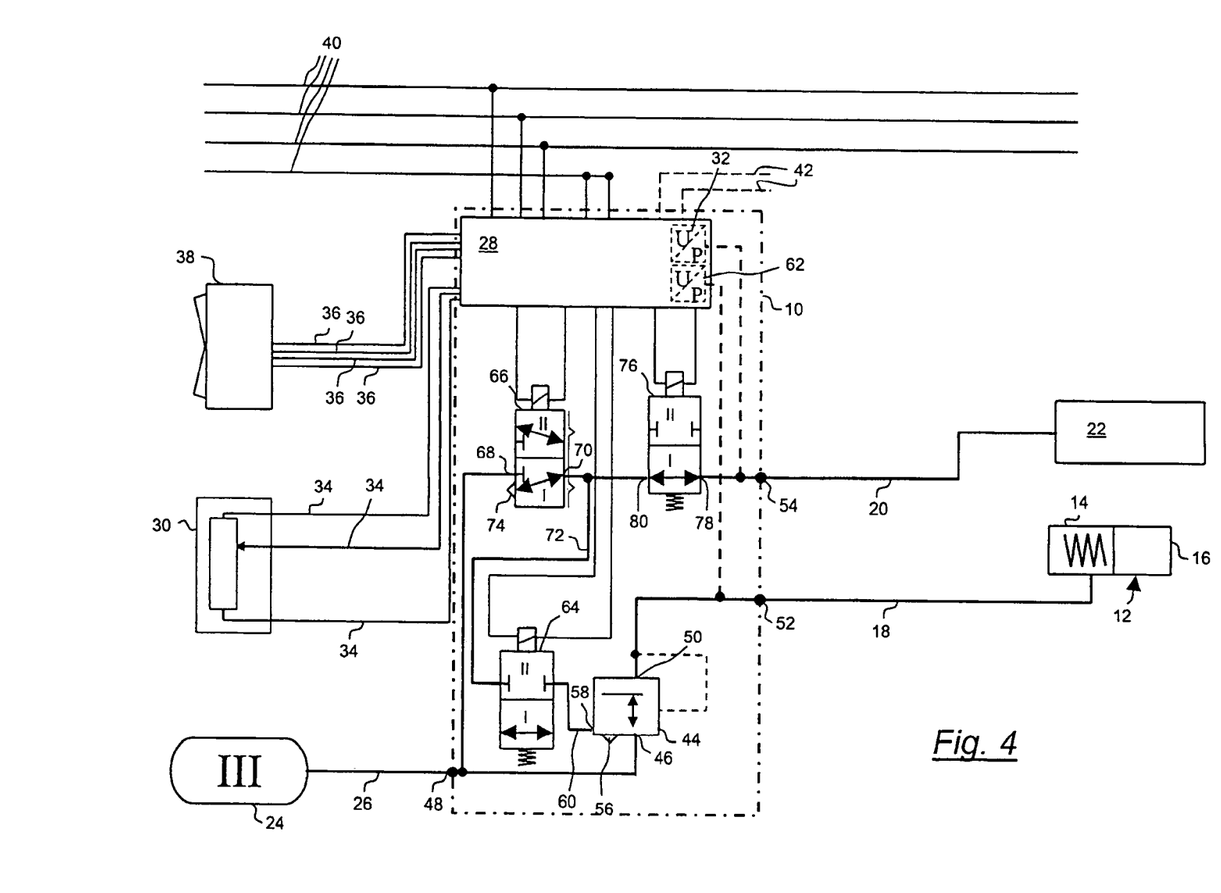
FIG. 4 is a schematic diagram of the parking brake module in a state for clarifying a trailer safety brake function.

The illustrated parking brake module 10 permits implementation of a basic parking brake function as described below with reference to FIG. 2, of a trailer monitoring function as described below with reference to FIG. 3, and of a trailer safety brake function as described below with reference to FIG. 4. FIGS. 1 to 4 therefore show the same design but in different switched states of the valves.

In addition, the parking brake module 10 implements protection of what is referred to as the hill-holder function that can be implemented in particular in conjunction with an electronic brake system. This hill-holder function is a starting aid that facilitates starting on a slope by maintaining the pressure in the service brake even if the vehicle driver does not activate (or no longer activates) the service brake.

FIG. 2 shows the parking brake module 10 according to FIG. 1, and serves to illustrate the basic parking brake function. In the state illustrated in FIG. 2, the reservoir pressure is fed to the control inlet 58 of the relay valve 44 via the bistable valve 66 and the pressure-holding valve 64, and, therefore, a pressure that corresponds to the reservoir pressure is modulated at the outlet 50 of the relay valve 44 and is then fed to the spring-type brake cylinder 12 via the compressed air line 18. As a result, the spring-loaded component 14 is ventilated and the parking brake is therefore released.

At the same time, in the illustrated position of the valves of the parking brake module 10, the trailer control valve 22 is also ventilated and supplied with the pressure of the compressed air from the compressed air reservoir vessel 24. However, since the trailer control valve 22 inverts, at its outlet, the pressure that is present at its inlet, the pressure at the outlet of the trailer control valve 22 is at a minimum in the state illustrated in FIG. 2, with the result that a trailer that is connected to the trailer control valve 22 would be unbraked.

By means of the pressure-holding valve 64 and the second valve device 76, it is possible to limit the pressure in the pressure medium duct 72 in so far as this is intended by the driver or by the brake system.

In order to apply the parking brake, the bistable valve 66 is switched over to its first switched position so that the control pressure is vented at the control inlet 58 of the relay valve 44 and, therefore, also at the outlet 50 of the relay valve 44, and, therefore, in total, the spring-loaded component 14 of the spring-type brake cylinder 12 is also vented. The spring energy store then generates a pressure on the wheel brakes with the result that the towing vehicle is braked. At the same time, the pressure in the line 20 to the trailer control valve 22 is also reduced with the result that the service brake in the trailer increases a pressure in the brake cylinders of the trailer and, therefore, a braking force owing to the inverting effect of the trailer control valve 22. That is, the trailer is also braked when the bistable valve 66 is switched over to venting.

If the hill-holder function is activated, the control unit 28 energizes the pressure-holding valve 64 and the second valve device 76, with the result that both valves 64, 76 close. In addition, the bistable valve 66 is switched over to its first switched state, with the result that it vents. If, when the hill-holder function is activated, the electrical power supply fails, the spring-loaded valves, specifically the pressure-holding valve 64 and the second valve device 76, switch back into the basic position illustrated in FIG. 2 (the first switched state in each case), with the result that these valves are opened, and the spring-loaded component 14 of the spring-type brake cylinder 12 and the trailer control valve 22 are, therefore, vented. In this way, the vehicle is securely held by means of the parking brake of the towing vehicle and the brake of the trailer vehicle.

FIG. 3 shows the parking brake module 10 from FIGS. 1 and 2, with the trailer monitoring position being illustrated with reference to FIG. 3. The trailer monitoring position is intended to enable the driver to check whether the parking brake, i.e., the spring energy store of the towing vehicle, is alone sufficient to hold the entire vehicle combination including the towing vehicle and trailer vehicle. To do this, the vehicle combination has to be first stopped and the parking brake applied. For this purpose, both the spring-type brake cylinder 12 and the trailer control valve 22 are therefore vented. However, as a result of the inverting function of the trailer control valve, the trailer vehicle is also braked by means of the trailer brake. In order to determine whether the towing vehicle also has to hold an unbraked trailer, the driver must first release the brake of the trailer vehicle. To do this, it is necessary to ventilate the trailer control valve 22. This is illustrated in FIG. 3.

The spring-loaded component 14 of the spring-type brake cylinder 12 is first vented by virtue of the fact that the pressure-holding valve 64 is de-energized and the bistable valve 66 is placed in its first switched state. The pressure-holding valve 64 is then energized. It therefore shuts off the control inlet 58 of the relay valve 44. This prevents venting of the spring-type brake cylinder 12. The bistable valve 66 is then switched over to the position illustrated in FIG. 3, i.e., into the second switched position, while the second valve device 76 is de-energized, with the result that the pressure of the compressed air reservoir vessel 24 is conducted to the trailer control valve 22.

In this state, the trailer control valve 22 is vented. The trailer brakes are therefore released without the parking brake of the towing vehicle being released.

In order to terminate the trailer monitoring position, the bistable valve 66 is first switched over again to ventilation, i.e., to the first switched state, and the pressure-holding valve 64 is then opened, i.e., placed in the de-energized state.

FIG. 4 illustrates the parking brake module 10 with the trailer safety brake function activated. With this function, the intention is that the trailer vehicle is braked while the towing vehicle is unbraked. A vehicle can therefore, to a certain extent, be straightened, which is advantageous, for example, on sections of roadway with negative gradients. In addition, such a trailer safety brake function can be appropriate on slippery underlying surfaces. It is also used to test the braking effect of the trailer. Finally, with the trailer safety brake function, it is also possible to check the connection of the towing vehicle to the trailer vehicle.

When the trailer safety brake function is activated, the parking brake is first released. For this purpose, the spring-type brake cylinder 12 is ventilated. If the driver then wishes to brake only the trailer, the trailer control valve 22 is vented. For this purpose, the pressure-holding valve 64 is energized and, therefore, shut off or closed, in order to keep the parking brake of the towing vehicle released—the parking brake being implemented by means of the spring-type brake cylinder 12. If the bistable valve 66 is switched over to the position (first switched state) illustrated in FIG. 4 and the trailer control valve 22 is vented, either the desired pressure or the desired deceleration of the vehicle is brought about. When the desired value is reached, the pressure in the trailer control valve can be held by means of the second valve device 76. If the driver varies the deceleration request by means of the electrical activation unit 30, the pressure can be modulated in accordance with the driver's request by means of the bistable valve 66 and the second valve device 76. If the control is carried out by means of the pressure, the pressure sensor 32, which can determine the pressure in the trailer control valve 22, is used. The bistable valve 66 and the second valve device 76 are then correspondingly opened or closed as a function of the pressure measured by the pressure sensor 32, until the desired pressure is reached.

FIGS. 5 to 8 show a further exemplary embodiment of a parking brake module 10 according to the present invention. This exemplary embodiment corresponds essentially to the exemplary embodiment shown in FIGS. 1 to 4, but the second valve device according to FIGS. 5 to 8 is of a different design and is, therefore, denoted by 76'.

The second valve device 76' has, in addition to a first port 78 and a second port 80, a third port 82 that is connected to the outlet 50 of the relay valve 44. The second valve device 76' also has a third switched state, in which the first port 78 is connected to the third port 82, and the second port 80 is shut off from the first port 78 and the third port 82. This second valve device 76' is embodied as an electrically activated double-armature solenoid valve 84 (that is additionally illustrated separately in a simplified sectional view in FIGS. 5 to 8). In the de-energized state, the second valve device 76' assumes a third switched state. In this third switched state, the first port 78 is connected to the third port 82, and the second port 80 is shut off from the first port 78 and from the third port 82.

The first switched state of the second valve device discussed above in conjunction with FIGS. 1 to 4, is assumed in a first energized state of the valve device 76'. In this state, the first port 78 is connected to the second port 80, while the second port 80 is shut off from the first port 78 and the third port 82.

The second valve device 76' assumes the second switched state in a second energized state, all the ports 78, 80 and 82 being respectively shut off from one another in this switched state.

The double-armature solenoid valve 84 has a coil (not illustrated) that can be energized. Unless this coil is energized, the second valve device 76' remains in the third switched state owing to the pretension of a spring. When the coil is energized with a first low current, the second valve device 76' moves into the first switched state. When it is energized with a higher current, the second valve device 76' goes into the second switched state.

The double-armature solenoid valve 84 has a primary armature 86 and a secondary armature 88. At first, i.e., when there is a low current, the primary armature is attracted, while the secondary armature 88 remains essentially in a position of rest. However, with a relatively high current, the secondary armature 88 is also attracted, with the result that the second valve device 76' then assumes its second switched state.

Figure 5:
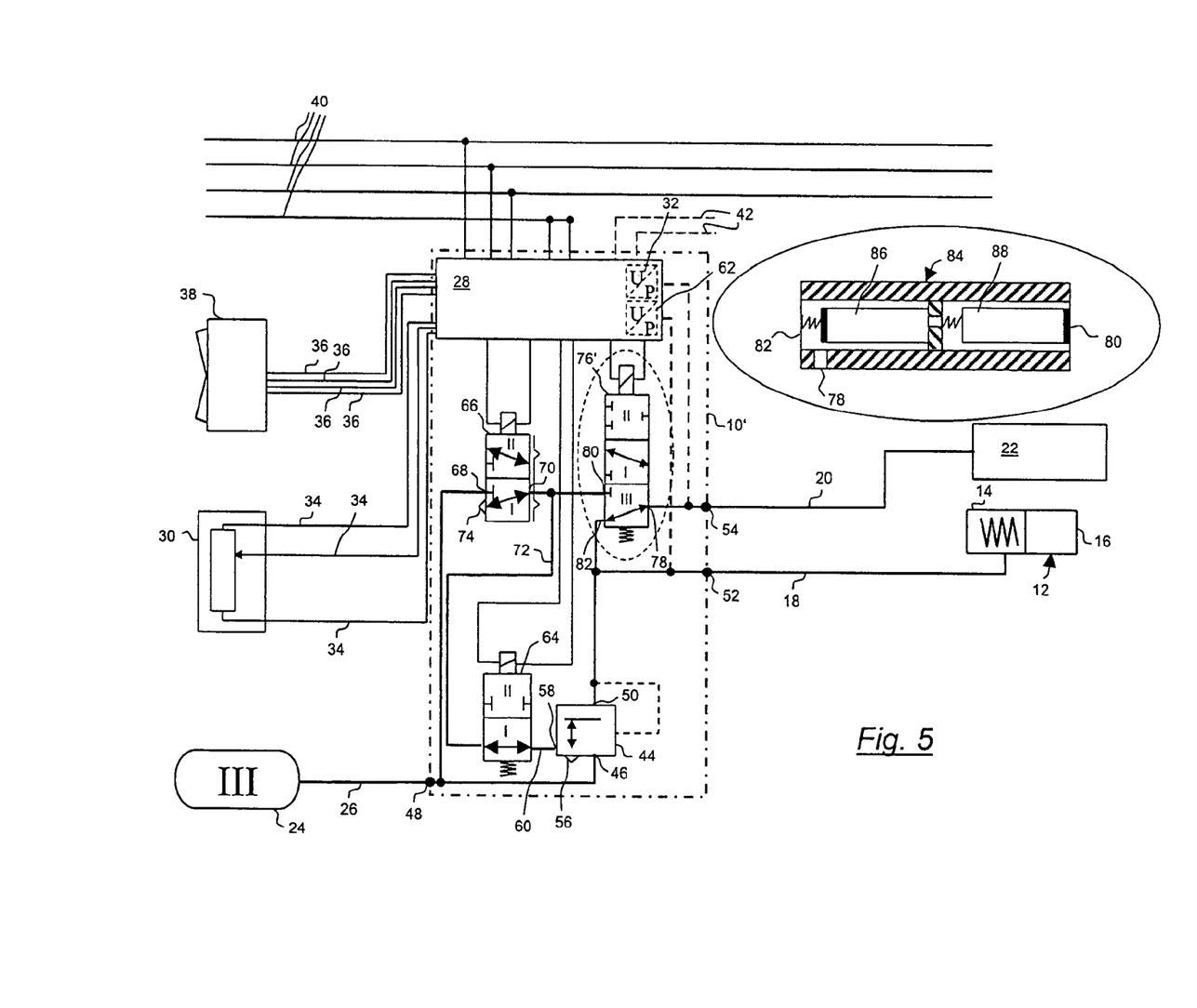
FIG. 5 is a schematic diagram of a parking brake module according to a second exemplary embodiment of the present invention.

The exemplary embodiment shown in FIG. 5 permits, when the second valve device 76' is de-energized, pressure-actuation of the trailer control valve 22 according to the pressure-actuation of the spring-type brake cylinder 12. That is, the spring-type brake cylinder 12 is coupled to the trailer control valve 22 with respect to the pressure. At the same time, energization of this second valve device 76' permits the same states to be set as are possible in the exemplary embodiment shown in FIGS. 1 to 4.

Figure 6:
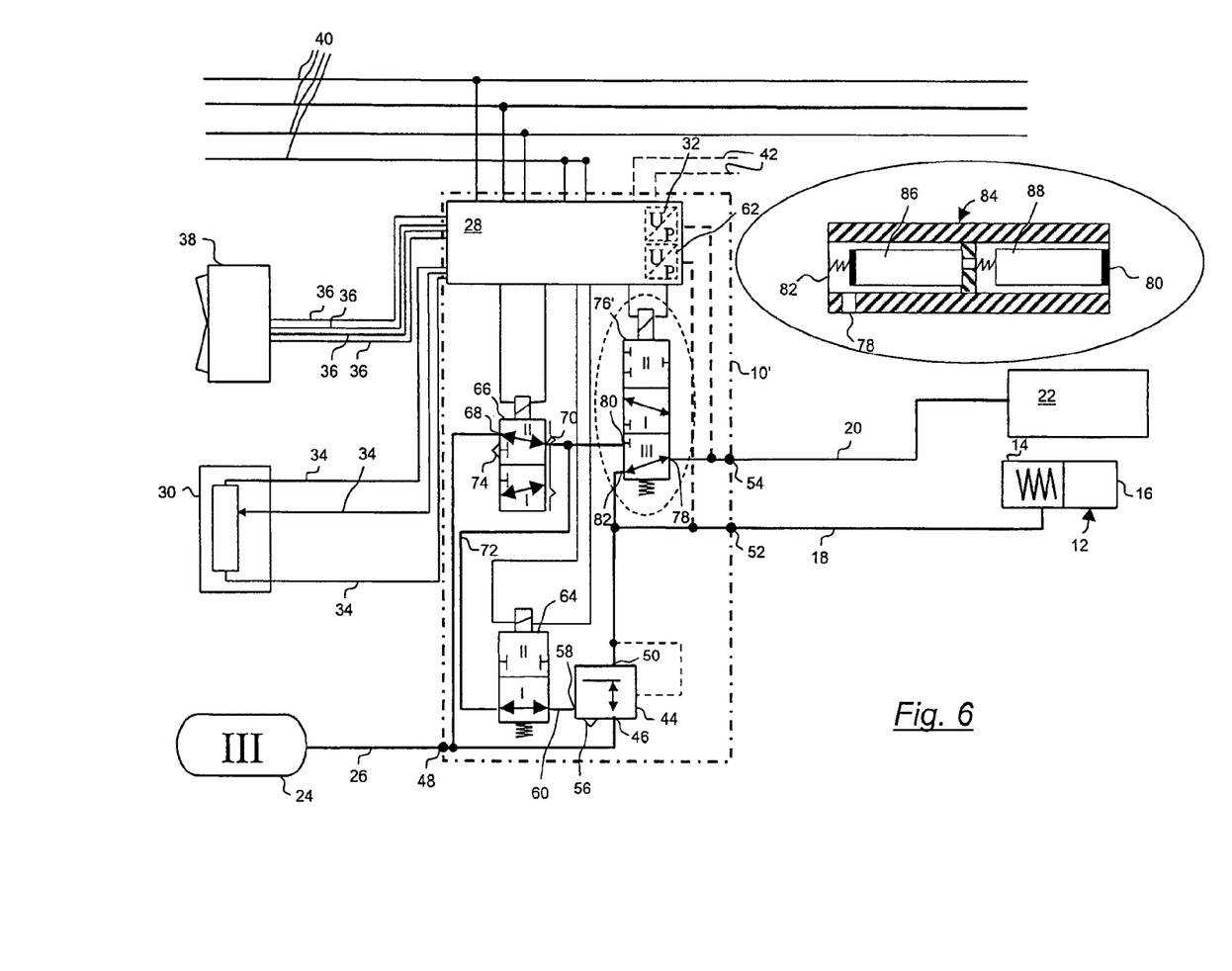
FIG. 6 is a schematic diagram of the parking brake module according to FIG. 5 in a state for clarifying the parking brake function.

The state according to FIG. 6, therefore, corresponds essentially to the state shown in FIG. 2, and, specifically, in the de-energized state of the pressure-holding valve 64 and of the second valve device 76', the same pressure is present at the first port 78 of the second valve device, i.e., at the port leading to the trailer control valve 22, as is present at the outlet 50 of the relay valve 44 (even if the first port 78 is shut off from the second port 80 of the second valve device 76' in the exemplary embodiment shown in FIG. 6).

In order to apply the parking brake, the bistable valve 66 is switched over to venting, i.e., into the first switched state, with the result that the vehicle is braked.

Figure 7:
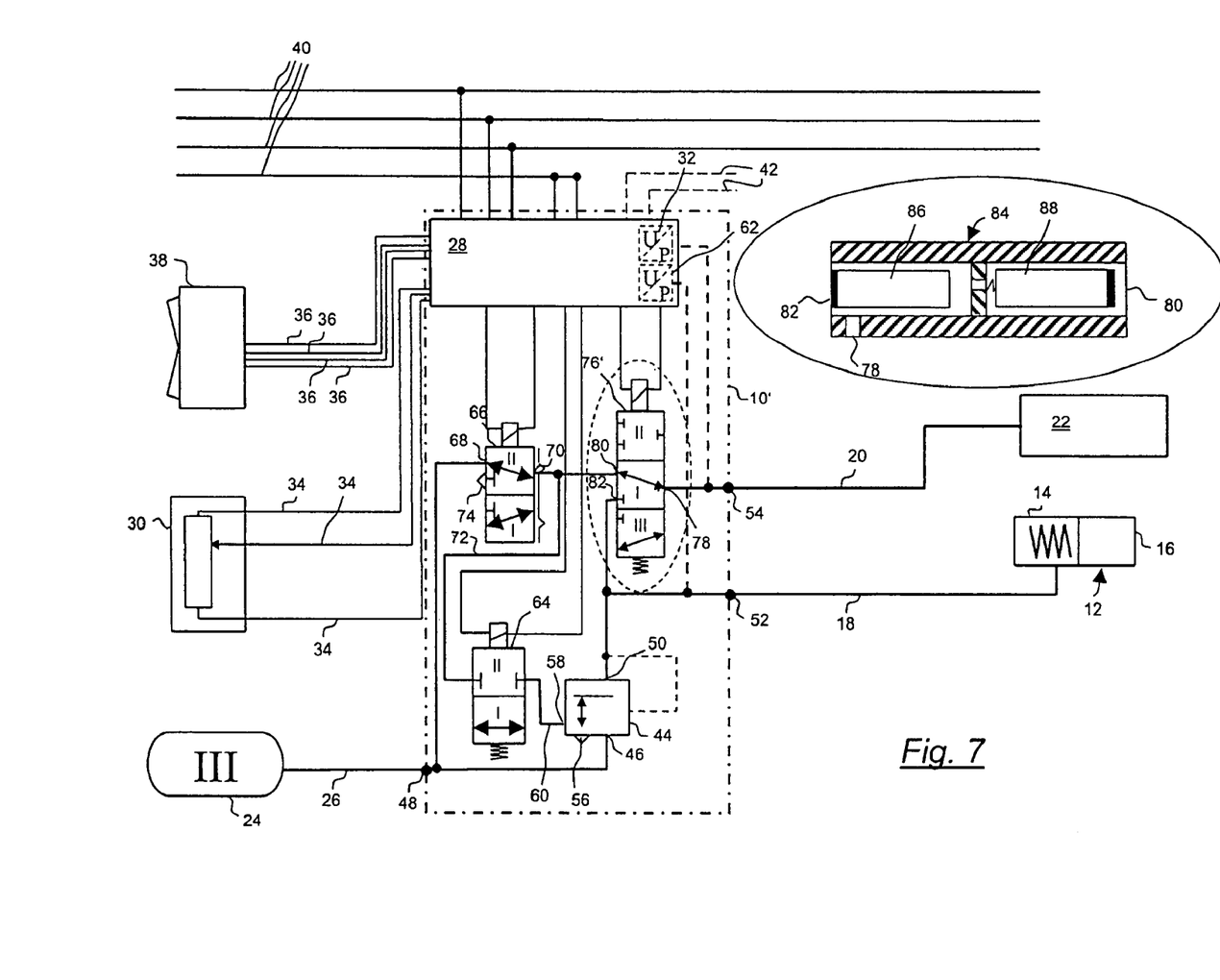
FIG. 7 is a schematic diagram of the parking brake module according to FIG. 5 in a state for clarifying the trailer monitoring setting.

FIG. 7 corresponds to the state illustrated in FIG. 3 for illustrating the trailer monitoring position. However, according to FIG. 7, for this purpose, the second valve device 76' is placed in the first switched state in which the coil of the double-armature solenoid valve 84 is energized with a first, low current. However, for the rest, the mode of operation of the trailer monitoring position according to FIG. 7 corresponds to the mode of operation described for FIG. 3, so that reference is made to the discussion hereinabove.

Figure 8:
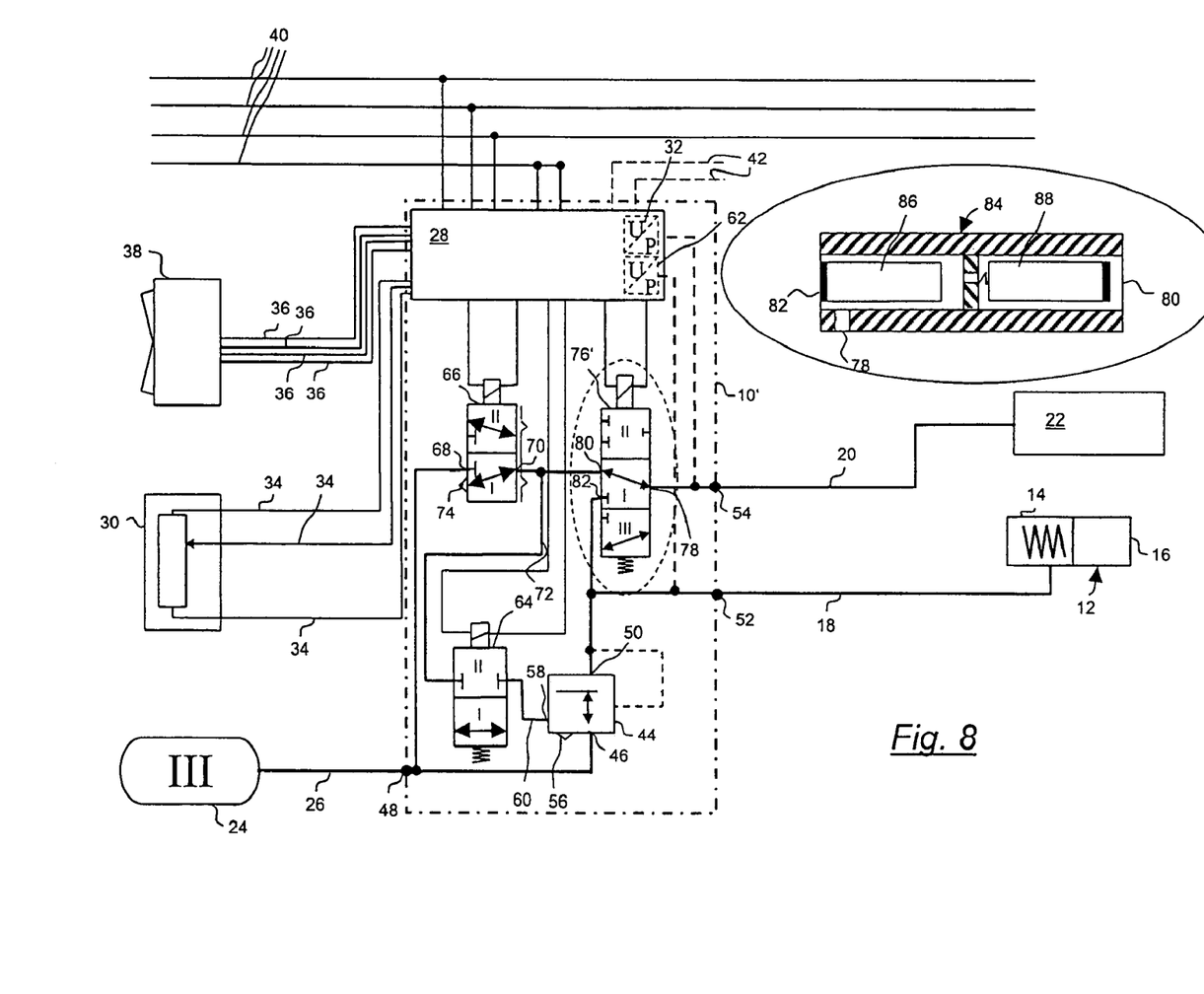
FIG. 8 is a schematic diagram of the parking brake module according to FIG. 5 in a state for clarifying the trailer safety brake function.

FIG. 8 corresponds, in turn, to the situation shown in FIG. 4 for describing the trailer safety brake function; but, in turn, the second valve device 76' is in a first energized state with a low current in order to connect the first port 78 of the second valve device 76' to the second port 80 of this valve device. For the rest, the mode of operation corresponds, however, to the mode of operation discussed in conjunction with FIG. 4, so that reference is made to the discussion hereinabove with respect to FIG. 4.

Figure 9:
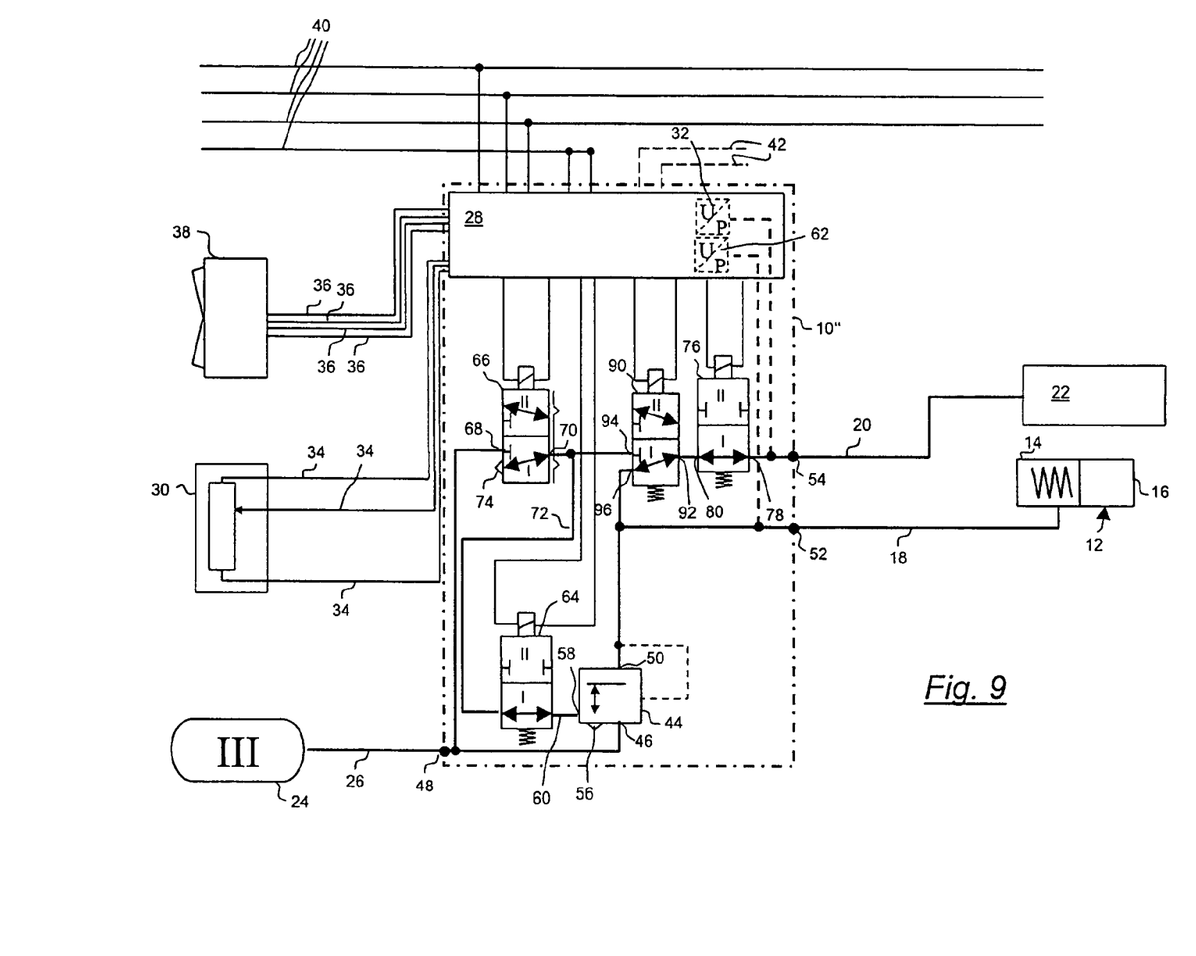
FIG. 9 is a schematic diagram of a parking brake module according to a third exemplary embodiment of the present invention.

FIG. 9 shows a further exemplary embodiment of a parking brake module 10". This exemplary embodiment corresponds structurally essentially to the exemplary embodiment shown in FIGS. 1 to 4, and functionally essentially to the exemplary embodiment shown in FIGS. 5 to 8. In this exemplary embodiment, a further, third valve device 90 is arranged between the second valve device 76, which is embodied as in FIGS. 1 to 4, and the pressure medium duct 72 or the bistable valve 66 and the relay valve 44. This third valve device 90 has at least two switched states, and, in a first switched state, the second port 80 of the second valve device 76 is connected to the outlet 50 of the relay valve 44 and shut off from the pressure medium duct 72. In a second switched state of this third valve device, the second port 80 of the second valve device is connected to the pressure medium duct 72 and shut off from the outlet of the relay valve 44.

The third valve device is embodied as an electrically activated, spring-loaded 3/2 way solenoid valve. Owing to the spring loading, this third valve device 90 assumes the first switched state in a de-energized state, and the second switched state in an energized state.

The third valve device 90 has a first port 92, a second port 94 and a third port 96. In the first switched state, the first port 92 is connected to the third port 96, while the second port 94 is shut off from the first port 92 and the third port 96. In the second switched state, the first port 92 is connected to the second port 94, while the third port 96 is shut off from the first port 92 and the second port 94.

The first port 92 is connected to the second port 80 of the second valve device. The second port 94 is connected to the pressure medium duct 72. The third port 96 is connected to the outlet 50 of the relay valve 44.

By suitably actuating the second valve device 76 and the third valve device 90, and also the other valves, specifically, the pressure-holding valve 64 and the bistable valve 66, it is also possible to use this embodiment to carry out the functions discussed in conjunction with FIGS. 1 to 4.

Figure 10:
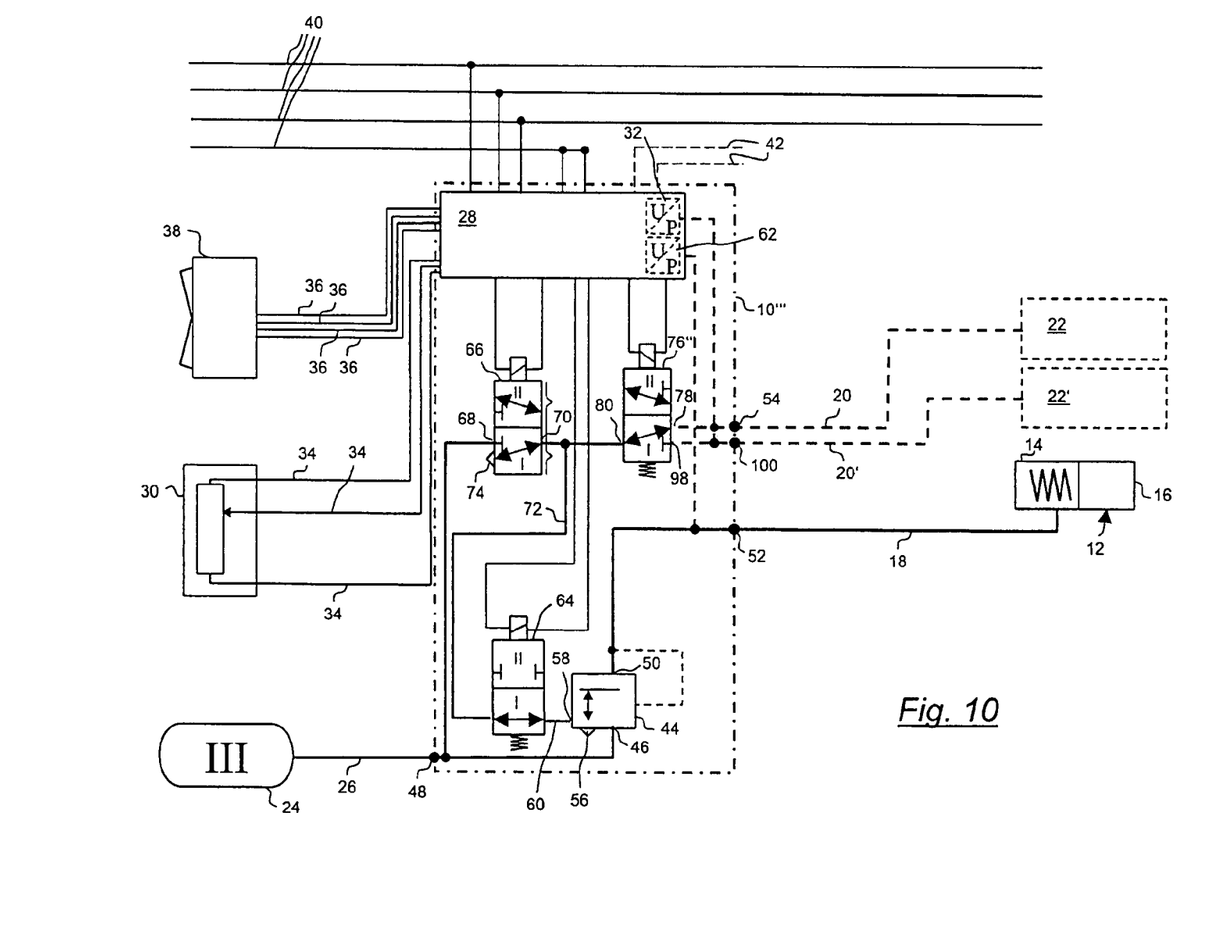
FIG. 10 is a schematic diagram of a parking brake module according to a fourth exemplary embodiment of the present invention.

FIG. 10 shows a further exemplary embodiment of a parking brake module 10'''. In this exemplary embodiment, the second valve device 76''' has a third port 98 that serves as a further trailer control valve port. Port 98 is connected to a further port 100, intended for a trailer control valve, on the parking brake module 10". In the first switched state of the second valve unit 76", the third port 98 is shut off from the other two ports 78, 80 of the second valve device 76'''. A line that can be connected to the third port 98 of the second valve device 76''' can therefore be shut off with respect to a trailer control valve 22'.

In contrast, in the second switched state of the second valve device 76''', the third port 98 is connected to the second port 80. In this way, the pressure for a trailer control valve 22' that can be connected to the third port 98 of the second valve device 76''' can be open-loop or closed-loop controlled by means of the parking brake module 10'''.

The second valve device 76''' is embodied as an electrically activated 3/2 way solenoid valve.

For the rest, the embodiment illustrated in FIG. 10 corresponds to the embodiments shown in the other figures, so that reference is made to the discussions hereinabove.

By means of the embodiment of the present invention shown in FIG. 10, it is possible to implement further parking brake designs for the parking brake module. Providing two ports 54, 100 for a trailer control valve on the parking brake module 10''' enables the trailer to be braked when the vehicle is parked by using the port 54 for a trailer control valve 22. This is done by venting the line from the parking brake module 10''' to the trailer control valve 22. Since the trailer control valve carries out an inverting function, a pressure is therefore applied to the service brake of the trailer, with the result that the service brake brakes the trailer. However, such a braking effect can be partially problematic. Specifically, if the pressure in the trailer escapes, the entire vehicle combination can begin to move if the brakes of the towing vehicle do not provide a sufficient braking effect.

In some countries, there is therefore provision that the trailer vehicle must not be braked by means of the service brake when it is parked. In this way, when parking the vehicle combination, the driver immediately notices whether the braking effect of the brakes of the towing vehicle is sufficient. For these jurisdictions, the port 100 of the parking brake module 10''' connected to the third port 98 of the second valve device 76''' is used to connect the trailer control valve 22'. In this context, specifically the pressure in the line 20' leading to the trailer control valve is held since, when the second valve device 76''/is de-energized or the vehicle is parked, the second valve device 76''' shuts off the line 20' from the trailer control valve 22' when the port 100 is used. As a result, owing to the inverting effect of the trailer control valve 22', the service brake of the trailer is released. When the driver parks the vehicle, the driver therefore realizes immediately whether the braking effect of the brakes of the towing vehicle are sufficient to hold the entire vehicle combination.

The exemplary embodiment of the present invention shown in FIG. 10 can therefore be used for different parking brake designs, namely such designs in which either the trailer vehicle is braked or not braked when the vehicle combination is parked. Overall, the structure of parking brake modules can therefore be standardized, which considerably simplifies the administration for the components to be selected for the vehicle configuration and also the administration for spare parts. A saving is therefore obtained in the production of such parking brake modules and the administration of the corresponding parts numbers.

All the features mentioned in the above description and in the claims can also be combined individually with the parking brake module according to the present invention. The present invention is therefore not restricted to the described or claimed feature combinations. Instead, all combinations of individual features are to be considered as being disclosed.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A parking brake module for a pressure medium-operated brake system of a vehicle having a parking brake function enabled by at least one spring-type brake cylinder, said parking brake module comprising:
   a first, pressure medium-quantity-boosting valve device including an inlet that can be placed in communication with a pressure medium reservoir, an outlet that can be placed in communication with at least one spring-loaded component of a spring-type brake cylinder, and a control inlet in communication with a control line, and
   a second valve device including at least a first port that can be placed in communication with a trailer control valve to control a trailer brake,
   wherein a prevailing pressure at said first port of said second valve device can be set independently of (i) pressure in said pressure medium reservoir and (ii) pressure at said outlet of said first valve device.

2. The parking brake module according to claim 1, further comprising:
   a pressure-holding valve upstream of said control inlet of said pressure medium-quantity-boosting valve device, said pressure holding valve being constructed and arranged to at least one of shut and open said control line, and
   a further valve having two switched states, said further valve including an inlet that can be placed in communication with said pressure medium reservoir vessel, and an outlet in communication with said pressure-holding valve via a pressure medium duct,
   wherein in a first switched state pressure medium can be carried away from said pressure-holding valve, and in a second switched state pressure medium can be fed to said pressure-holding valve, and
   wherein said second valve device has a second port that can be placed in communication with said pressure medium duct.

3. The parking brake module according to claim 2, wherein said further valve is a bistable valve.

4. The parking brake module according to claim 2, further comprising a third valve device having at least two switched states arranged between said second port of said second valve device and said outlet of said pressure medium-quantity-boosting valve device and said pressure medium duct, wherein in a first switched state of said third valve device said second port of said second valve device is in communication with said outlet of said pressure medium-quantity-boosting valve device and is shut off from said pressure medium duct, and in a second switched state of said third valve device said second port of said second valve device is in communication with said pressure medium duct and is shut off from said outlet of said pressure medium-quantity-boosting valve device.

5. The parking brake module according to claim 4, wherein said third valve device is an electrically activated 3/2 way solenoid valve.

6. The parking brake module according to claim 5, wherein the said first switched state of said third valve device is assumed in a de-energized state and said second switched state of said third valve device is assumed in an energized state.

7. The parking brake module according to claim 4, further comprising an electronic control unit constructed and arranged to activate said pressure-holding valve, said further valve, said second valve device and said third valve device.

8. The parking brake module according to claim 7, wherein said electronic control unit is in communication with an electrical activation unit for activating trailer brakes by said trailer control valve, said electronic control unit controlling said pressure-holding valve, said further valve, said second valve device and said third valve device as a function of an electrical signal generated by said activation unit.

9. The parking brake module according to claim 2, further comprising an electronic control unit constructed and arranged to activate said pressure-holding valve, said further valve and said second valve device.

10. The parking brake module according to claim 9, wherein said electronic control unit is in communication with an electrical activation unit for activating trailer brakes by said trailer control valve, said electronic control unit controlling said pressure-holding valve, said further valve and said second valve device as a function of an electrical signal generated by said activation unit.

11. The parking brake module according to claim 1, wherein said second valve device has at least two switched states, and in a first switched state said first port of said second valve device is in communication with a second port of said second valve device, and in a second switched state said first port of said second valve device is shut off from said second port of said second valve device enabling a line leading to said trailer control valve that can be placed in communication with said first port of said second valve device to be shut off.

12. The parking brake module according to claim 11, wherein said second valve device has a third port that is in communication with said outlet of said pressure medium-quantity-boosting valve device, and wherein in a third switched state said first port of said second valve device is in communication with said third port of said second valve device, and said second port of said second valve device is shut off from said first port and said third port of said second valve device.

13. The parking brake according to claim 12, wherein said second valve device is an electrically activated double-armature solenoid valve.

14. The parking brake module according to claim 13, wherein said second valve device:
   a) assumes said first switched state in a first energized state,
   b) assumes said second switched state in a second energized state in which a current of a coil of said double-armature solenoid valve is higher than in said first energized state, and
   c) assumes said third switched state in a de-energized state.

15. The parking brake module according to claim 11, wherein said second valve device has a third port that can be placed in communication with a further trailer control valve, wherein in said first switched state of said second valve device said third port is shut off from said first and second ports of said second valve device, enabling a line leading to said further trailer control valve that can be placed in communication with said third port to be shut off, and in said second switched state of said second valve device said third port is in communication with said second port of said second valve device.

16. The parking brake module according to claim 15, wherein said second valve device is a 3/2 way solenoid valve.

17. The parking brake module according to claim 1, further comprising a pressure sensor connected to said first port of said second valve device to measure pressure conducted from said first port of said second valve device to said trailer control valve.

18. The parking brake module according to claim 1, further comprising a pressure sensor connected to said outlet of said pressure medium-quantity-boosting valve device to measure pressure conducted to said spring-type brake cylinder.

19. The parking brake module according to claim 1, wherein said pressure medium-quantity-boosting valve device is a relay valve.

20. The parking brake module according to claim 1, wherein said second valve device is an electrically activated 2/2 way solenoid valve.

21. The parking brake module according to claim 20, wherein said second valve device assumes a first switched state in a de-energized state and a second switched state in an energized state.

\* \* \* \* \*